US012729327B2

(12) United States Patent
Yamazaki et al.

(10) Patent No.: US 12,729,327 B2
(45) Date of Patent: Sep. 8, 2026

(54) AQUEOUS ADHESIVE COMPOSITION

(71) Applicant: SEIKO EPSON CORPORATION, Tokyo (JP)

(72) Inventors: Soichi Yamazaki, Shiojiri (JP); Nikako Tsukiji, Matsumoto (JP); Harunobu Komatsu, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 160 days.

(21) Appl. No.: 18/621,275

(22) Filed: Mar. 29, 2024

(65) Prior Publication Data

US 2024/0327683 A1 Oct. 3, 2024

(30) Foreign Application Priority Data

Mar. 30, 2023 (JP) ................................ 2023-055592

(51) Int. Cl.

| | |
|---|---|
| ***C09J 133/08*** | (2006.01) |
| ***B41J 3/407*** | (2006.01) |
| ***B41J 15/04*** | (2006.01) |
| ***C09J 11/04*** | (2006.01) |
| ***C09J 11/06*** | (2006.01) |

(52) U.S. Cl.

CPC .......... *C09J 133/08* (2013.01); *B41J 3/4078* (2013.01); *B41J 15/048* (2013.01); *C09J 11/04* (2013.01); *C09J 11/06* (2013.01)

(58) Field of Classification Search

CPC combination set(s) only.
See application file for complete search history.

(56) References Cited

U.S. PATENT DOCUMENTS

| | | | |
|---|---|---|---|
| 2002/0151628 | A1 | 10/2002 | Dheret et al. |
| 2022/0243392 | A1 | 8/2022 | Yamada et al. |

FOREIGN PATENT DOCUMENTS

| | | | | |
|---|---|---|---|---|
| JP | S46-028229 | | 9/1971 | |
| JP | S57-125277 A | | 8/1982 | |
| JP | S59-053790 A | | 3/1984 | |
| JP | 2004-067803 A | | 3/2004 | |
| JP | 2020-109036 A | | 7/2020 | |
| JP | 2022-116603 A | | 8/2022 | |
| JP | 2023-005656 A | | 1/2023 | |
| WO | WO-2021080879 A1 | * | 4/2021 | ............. G01J 5/064 |
| WO | 2021-081879 A1 | | 5/2021 | |

* cited by examiner

*Primary Examiner* — Peter A Salamon

(74) *Attorney, Agent, or Firm* — Harness, Dickey & Pierce, P.L.C.

(57) ABSTRACT

An aqueous adhesive composition to form an adhesive layer on a surface of a cloth transport member of an ink jet printing apparatus is provided. The aqueous adhesive composition includes an acrylic-based resin, an urethane-based resin, a surfactant, and water, and a content A of the acrylic-based resin is higher than a content U of the urethane-based resin.

14 Claims, 3 Drawing Sheets

| | | | | EXAMPLE | | | | | | | | | | | | | | | |
|---|---|---|---|---|---|---|---|---|---|---|---|---|---|---|---|---|---|---|---|
| | | | | 1 | | 2 | | 3 | | 4 | | 5 | | 6 | | 7 | | 8 | |
| | | | CONTENT | EXPERIMENT AMOUNT | CONTENT AMOUNT | EXPERIMENT AMOUNT | CONTENT AMOUNT | EXPERIMENT AMOUNT | CONTENT AMOUNT | EXPERIMENT AMOUNT | CONTENT AMOUNT | EXPERIMENT AMOUNT | CONTENT AMOUNT | EXPERIMENT AMOUNT | CONTENT AMOUNT | EXPERIMENT AMOUNT | CONTENT AMOUNT | EXPERIMENT AMOUNT | CONTENT AMOUNT |
| ACRYLIC-BASED RESIN | | BPW6441 (TOYOCHEM) | 60% | 89.5% | 53.7% | 83.8% | 50.3% | 74.3% | 44.6% | 63.3% | 38.0% | 36.8% | 22.1% | 30.8% | 18.5% | 82.8% | 49.7% | 76.7% | 46.0% |
| URETHANE-BASED RESIN | ETHER TYPE URETHANE | UA200 (SANYO CHEMICAL) | 30% | 3.3% | 1.0% | 10.0% | 3.0% | 16.7% | 5.0% | 33.3% | 10.0% | 56.7% | 17.0% | 60.0% | 18.0% | 10.0% | 3.0% | 10.0% | 3.0% |
| | ESTER TYPE URETHANE | UAX307 (SANYO CHEMICAL) | 41% | | | | | | | | | | | | | | | | |
| | CARBONATE TYPE URETHANE | UAX368 (SANYO CHEMICAL) | 50% | | | | | | | | | | | | | | | | |
| SURFACTANT | AMMONIUM LAURYL SULFATE | | 100% | 3.0% | 3.0% | 2.0% | 2.0% | 2.0% | 2.0% | 1.0% | 1.0% | 2.0% | 2.0% | 5.0% | 5.0% | 2.0% | 2.0% | 2.0% | 2.0% |
| | SODIUM LAURYL SULFATE | | 100% | | | | | | | | | | | | | | | | |
| ACID/ALKALI | AMMONIA AND AMMONIUM IONS | | 28% | 3.6% | 1.0% | 3.6% | 1.0% | 6.4% | 1.8% | 1.8% | 0.5% | 3.6% | 1.0% | 3.6% | 1.0% | 3.6% | 1.0% | 10.7% | 3.0% |
| | TRIETHYLAMINE | | 100% | 0.5% | 0.5% | 0.5% | 0.5% | 0.5% | 0.5% | 0.5% | 0.5% | 0.8% | 0.8% | 0.5% | 0.5% | 1.5% | 1.5% | 0.5% | 0.5% |
| | TRIETHANOLAMINE | | 100% | | | | | | | | | | | | | | | | |
| WATER | | | | 0.1% | BALANCE | 0.1% | BALANCE | 0.1% | BALANCE | 0.0% | BALANCE | 0.1% | BALANCE | 0.1% | BALANCE | 0.1% | BALANCE | 0.1% | BALANCE |
| pH | | | | 9 | | 9 | | 9 | | 8 | | 9 | | 9 | | 9 | | 10 | |
| EVALUATION | ADHESION | | | A | | A | | A | | A | | A | | B | | A | | A | |
| | PENCIL HARDNESS | | | A | | A | | A | | A | | A | | A | | B | | B | |
| | WATER RESISTANCE | | | A | | A | | A | | A | | A | | A | | C | | C | |

FIG. 2B

| | | | | EXAMPLE | | | | | | | | | | | | | | COMPARATIVE EXAMPLE | | | |
|---|---|---|---|---|---|---|---|---|---|---|---|---|---|---|---|---|---|---|---|---|---|
| | | | | 9 | | 10 | | 11 | | 12 | | 13 | | 14 | | 15 | | 1 | | 2 | |
| | | | CONTENT | EXPERIMENT AMOUNT | CONTENT AMOUNT | EXPERIMENT AMOUNT | CONTENT AMOUNT | EXPERIMENT AMOUNT | CONTENT AMOUNT | EXPERIMENT AMOUNT | CONTENT AMOUNT | EXPERIMENT AMOUNT | CONTENT AMOUNT | EXPERIMENT AMOUNT | CONTENT AMOUNT | EXPERIMENT AMOUNT | CONTENT AMOUNT | EXPERIMENT AMOUNT | CONTENT AMOUNT | EXPERIMENT AMOUNT | CONTENT AMOUNT |
| ACRYLIC-BASED RESIN | | BPW6441 (TOYOCHEM) | 60% | 84.8% | 50.9% | 84.8% | 50.9% | 60.5% | 36.3% | 87.5% | 52.5% | 93.8% | 56.3% | 84.3% | 50.6% | 43.3% | 26.0% | 25.7% | 15.4% | 96.8% | 58.1% |
| URETHANE-BASED RESIN | ETHER TYPE URETHANE | UA200 (SANYO CHEMICAL) | 30% | | | | | 33.3% | 10.0% | 10.0% | 3.0% | 3.3% | 1.0% | 10.0% | 3.0% | 50.0% | 15.0% | 63.3% | 19.0% | | |
| | ESTER TYPE URETHANE | UAX307 (SANYO CHEMICAL) | 41% | 12.2% | 5.0% | | | | | | | | | | | | | | | | |
| | CARBONATE TYPE URETHANE | UAX368 (SANYO CHEMICAL) | 50% | | | 10.0% | 5.0% | | | | | | | | | | | | | | |
| SURFACTANT | AMMONIUM LAURYL SULFATE | | 100% | 0.8% | 0.8% | 1.0% | 1.0% | | | | | 1.0% | 1.0% | 2.0% | 2.0% | 3.0% | 3.0% | 3.0% | 3.0% | 1.0% | 1.0% |
| | SODIUM LAURYL SULFATE | | 100% | | | | | 2.0% | 2.0% | 2.0% | 2.0% | | | | | | | | | | |
| ACID/ALKALI | AMMONIA AND AMMONIUM IONS | | 28% | 1.8% | 0.5% | 3.6% | 1.0% | 3.6% | 1.0% | | | 1.8% | 0.5% | 3.6% | 1.0% | 3.6% | 1.0% | 7.1% | 2.0% | 1.8% | 0.5% |
| | TRIETHYLAMINE | | 100% | 0.3% | 0.3% | 0.5% | 0.5% | 0.5% | 0.5% | 0.5% | 0.5% | | | | | | | 0.8% | 0.8% | 0.3% | 0.3% |
| | TRIETHANOLAMINE | | 100% | | | | | | | | | | 0.5% | | | | | | | | |
| WATER | | | | 0.1% | BALANCE | 0.1% | BALANCE | 0.1% | BALANCE | 0.0% | BALANCE | 0.0% | BALANCE | 0.1% | BALANCE | 0.1% | BALANCE | 0.1% | BALANCE | 0.1% | BALANCE |
| pH | | | | 9 | | 8 | | 10 | | 8 | | 8 | | 8 | | 10 | | 9 | | 8 | |
| EVALUATION | ADHESION | | | A | | A | | A | | A | | A | | A | | B | | C | | A | |
| | PENCIL HARDNESS | | | A | | A | | A | | B | | B | | B | | A | | A | | C | |
| | WATER RESISTANCE | | | B | | B | | C | | C | | C | | C | | C | | B | | C | |

AQUEOUS ADHESIVE COMPOSITION

The present application is based on, and claims priority from JP Application Serial Number 2023-055592, filed Mar. 30, 2023, the disclosure of which is hereby incorporated by reference herein in its entirety.

BACKGROUND

1. Technical Field

The present disclosure relates to an aqueous adhesive composition.

2. Related Art

Since being able to record a highly fine image using a relatively simple apparatus, an ink jet recording method has been rapidly developed in various fields. Among the developments, various types of studies on an ejection stability and the like have been carried out. For example, as a printing technique using an ink jet method, in order to stabilize a contact state between a removal member and a transport member and in order to improve recovery performance of washing water by the removal member, JP-A-2020-109036 has disclosed a transport device including a displacement suppression member with respect to the transport member and an image recording apparatus.

As disclosed in JP-A-2020-109036, in the printing technique using an ink jet method, a cloth is adhered to a transport member, such as an endless belt, and is then transported to a printing portion. An adhesive is applied on a surface of the transport member, and hence, the surface of the transport member has an adhesiveness. The adhesive is also called a "temporary fixing adhesive (jibari agent)".

The cloth to be used as a recording medium is peeled away from the transport member after printing is performed and is then transported to the following step. On the other hand, since a new cloth is again to be adhered to the transport member from which the cloth is already peeled away, inks, lint, and other remaining materials adhered to the transport member are required to be removed. In general, the remaining materials, such as inks and lint, adhered to the transport member are washed out with water. In the case described above, a brush, a sponge, or the like may be used to wash the transport member in some cases.

As the adhesive used for the ink jet printing as described above, in order to have a resistance against water washing, in general, an adhesive prepared by dissolving a hydrophobic resin in an organic solvent has been used. However, in recent years, in order to reduce environmental loads and to improve working conditions, an aqueous adhesive in which usage of organic solvents is decreased has been required. However, since the aqueous adhesive is inferior in terms of water resistance, the adhesiveness of the adhesive provided on the surface of the transport member is gradually decreased by repeated washings, and hence, after every predetermined number of washings, a new adhesive is also required to be applied to the surface described above.

SUMMARY

According to an aspect of the present disclosure, there is provided an aqueous adhesive composition to form an adhesive layer on a surface of a cloth transport member of an ink jet printing apparatus, the aqueous adhesive composition comprising an acrylic-based resin, an urethane-based resin, a surfactant, and water, and in addition, a content A of the acrylic-based resin is higher than a content U of the urethane-based resin.

According to another aspect of the present disclosure, there is provided an adhesiveness imparting method comprising a step of forming an adhesive layer by adhering the aqueous adhesive composition described above to a surface of a cloth transport member of an ink jet printing apparatus.

According to another aspect of the present disclosure, there is provided an ink jet printing apparatus comprising a transport mechanism in which a cloth is adhered to an adhesive layer that is formed of the aqueous adhesive composition described above on a surface of a cloth transport member and is transported, a recording portion to perform printing recording using an ink jet head on the cloth adhered to the adhesive layer, and a washing portion to wash the adhesive layer from which the cloth is peeled away after the printing recording.

According to another aspect of the present disclosure, there is provided a cloth transport member of an ink jet printing apparatus, the cloth transport member having a surface on which an adhesive layer derived from the aqueous adhesive composition described above is provided.

According to another aspect of the present disclosure, there is provided an ink jet printing method comprising a transport step in which a cloth is adhered to an adhesive layer that is formed from the aqueous adhesive composition described above on a surface of a cloth transport member of an ink jet printing apparatus and is transported, a recording step of performing printing recording using an ink jet head on the cloth adhered to the adhesive layer, and a washing step of washing the adhesive layer from which the cloth is peeled away after the printing recording.

BRIEF DESCRIPTION OF THE DRAWINGS

FIG. 2A shows data of Examples.

FIG. 2B shows data of Examples.

DESCRIPTION OF EMBODIMENTS

Figure 1:
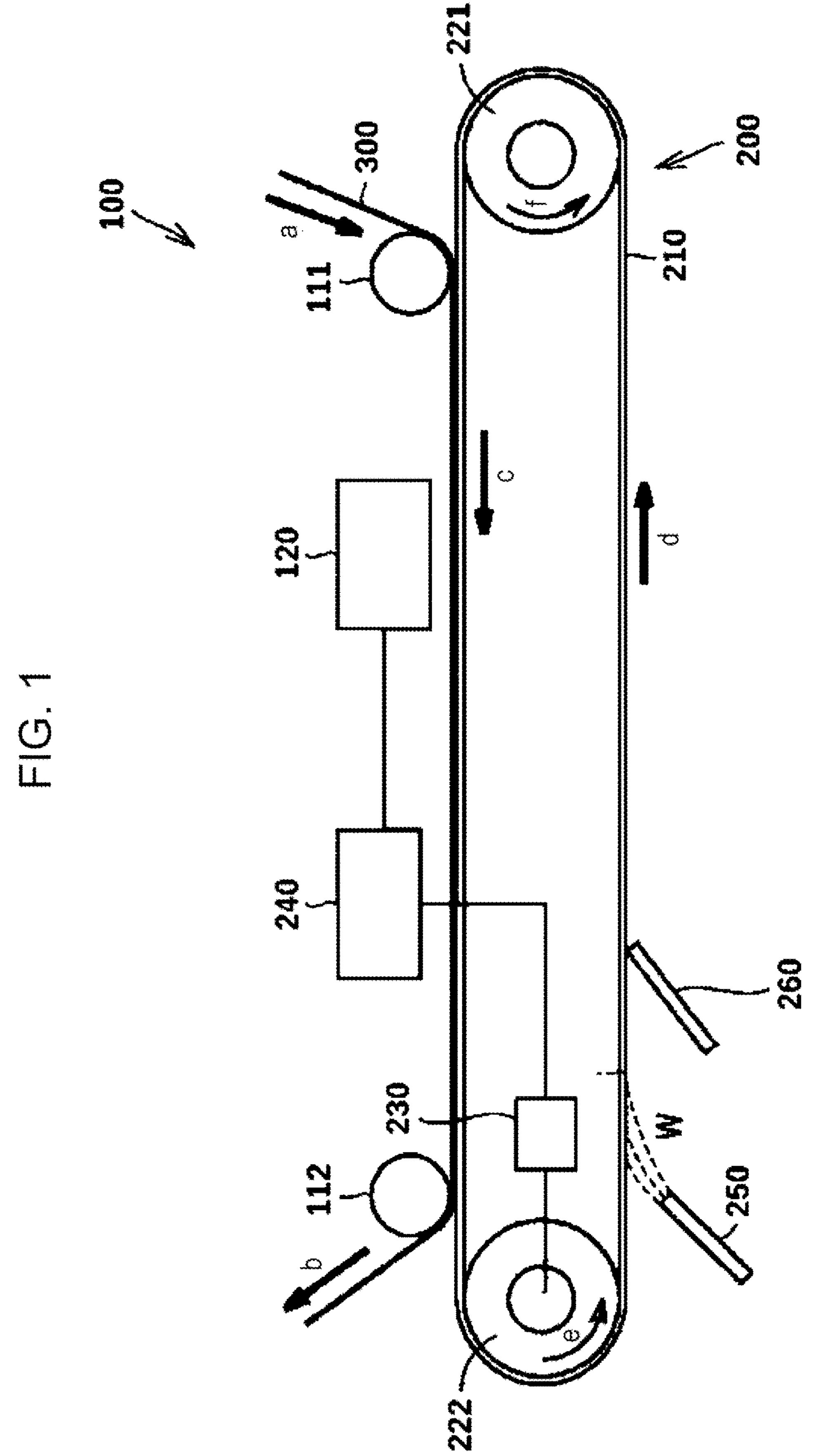
FIG. 1 is a schematic cross-sectional view of an ink jet printing apparatus.

Hereinafter, if needed, with reference to the drawings, although embodiments (hereinafter, each referred to as "this embodiment") of the present disclosure will be described in detail, the present disclosure is not limited thereto and may be variously changed and/or modified without departing from the scope of the present disclosure. In the drawings, the same elements are designated by the same reference numerals, and duplicated description will be omitted. In addition, unless otherwise particularly noted, the top to bottom and the left to right positional relationships are based on the positional relationships shown in the drawing. Furthermore, the dimensional rate shown in the drawing is not limited to that shown therein.

1. Aqueous Adhesive Composition

An aqueous adhesive composition to form an adhesive layer on a surface of a cloth transport member of an ink jet printing apparatus is provided, the aqueous adhesive composition described above includes an acrylic-based resin, an urethane-based resin, a surfactant, and water, and a content A of the acrylic-based resin is higher than a content U of the urethane-based resin.

In a related ink jet printing apparatus, an adhesive layer is formed on a transport member, such as an endless belt, and a cloth functioning as a recording medium is adhered to the adhesive layer. Subsequently, after the cloth is transported to a printing portion, and recording is then performed on the cloth, the transport member and the cloth are peeled away from each other.

As the adhesive used for the cloth transport member as described above, in the past, a solvent-based acrylic adhesive has been frequently used. However, when the solvent-based acrylic adhesive is applied, an organic solvent contained therein is evaporated, and hence adverse influences on human bodies in working conditions have been concerned. In addition, when the solvent-based acrylic adhesive is used, an exhaust device is required to be installed in use environment of the ink jet printing apparatus, and as a result, the total apparatus configuration is enlarged, and the cost thereof is also increased.

In addition, when the adhesive layer is formed on the cloth transport member of the ink jet printing apparatus by application of the adhesive, and when the cloth is transported while being adhered to the adhesive layer, a different problem may arise. That is, while having an appropriate adhesion to be adhered to the cloth and to be peeled away therefrom, the adhesive is required to have a water resistance and a mechanical strength against water washing which is performed to remove lint and inks adhered to the adhesive layer. However, an adhesive layer formed from an aqueous adhesive has an inferior water resistance. Hence, it has been difficult to enable an adhesive layer formed from an aqueous adhesive to have not only excellent water resistance but also excellent adhesion and mechanical strength.

In order to overcome the problem described above, in the aqueous adhesive composition of this embodiment, an acrylic-based resin to impart the adhesion, an urethane-based resin to improve a flexibility and the mechanical strength, and a surfactant are used in combination, and in addition, the acrylic-based resin is used in a larger amount. Accordingly, an adhesive layer formed from the aqueous adhesive composition of this embodiment is able to satisfy the adhesion, the water resistance, and the mechanical strength at the same time. Accordingly, in the printing, the aqueous adhesive composition of this embodiment is able to function as an adhesive layer to adhere the cloth to the cloth transport member, and in the following washing step, even when water washing is performed using a physical device, such as a brush or a sponge, damage on the adhesive layer caused by the water washing can be suppressed. Hereinafter, the components to be contained in the aqueous adhesive composition will be described in detail.

1.1. Acrylic-Based Resin

Since the acrylic-based resin is contained, the adhesion of the adhesive layer formed on the cloth transport member is further improved. The acrylic-based resin may be either a water-soluble resin or a resin emulsion in which a resin is dispersed in an aqueous medium. In this embodiment, those resins may also be collectively called the aqueous acrylic-based resin. Since the aqueous acrylic-based resin is used, the environmental loads by organic solvents can be reduced, and in addition, a peelability also tends to be further improved.

As the acrylic-based resin, any resin may be used as long as being a polymer obtained by polymerization using an acrylic-based monomer, such as (meth)acrylic acid or a (meth)acrylate ester, as one component, and for example, a resin obtained from an acrylic-based monomer or a copolymer obtained from an acrylic-based monomer and at least one of other monomers may be mentioned. The other monomers are not particularly limited, and for example, acrylamide, acrylonitrile, and styrene may be mentioned.

The content A of the acrylic-based resin with respect to a total mass of the aqueous adhesive composition is preferably 26 to 50 percent by mass, more preferably 30 to 50 percent by mass, and further preferably 35 to 50 percent by mass. Since the content A of the acrylic-based resin is 26 percent by mass or more, the adhesion and the water resistance of the adhesive layer tend to be further improved. In addition, since the content A of the acrylic-based resin is 50 percent by mass or less, the mechanical strength of the adhesive layer tends to be further improved.

In the aqueous adhesive composition of this embodiment, the content A of the acrylic-based resin is higher than the content U of the urethane-based resin. A ratio (A/U) of the content A of the acrylic-based resin to the content U of the urethane-based resin is preferably 1.01 to 50, more preferably 1.05 to 45, even more preferably 1.1 to 40, further preferably 1.5 to 35, even further preferably 2.5 to 30, particularly preferably 5.0 to 30, and more particularly preferably 7.5 to 30. Since the ratio (A/U) is in the range described above, the adhesion, the water resistance, and the mechanical strength of the adhesive layer tend to be further improved. The content A of the acrylic-based resin and the content U of the urethane-based resin are each based on a solid content basis.

1.2. Urethane-Based Resin

Since the urethane-based resin is contained, the flexibility of the adhesive layer formed on the cloth transport member is further improved, and the mechanical strength is further improved. The urethane-based resin may be either a water-soluble resin or a resin emulsion in which a resin is dispersed in an aqueous medium. Those resins are also collectively called the aqueous urethane-based resin in this embodiment. Since the aqueous urethane-based resin is used, the environmental loads by organic solvents can be reduced, and the peelability also tends to be further improved.

The urethane-based resin is not particularly limited as long as being a resin having an urethane bond, and for example, an ether type urethane-based resin having an ether bond in its main chain, an ester type urethane-based resin having an ester bond in its main chain, or a carbonate type urethane-based resin having a carbonate bond in its main chain may be mentioned.

Among those mentioned above, the ether type urethane-based resin is preferably contained. Although the urethane-based resin totally tends to be superior in mechanical strength, on the other hand, the resin described above tends to be inferior in water resistance. In particular, since having no functional groups, such as an ester group, to be subjected to the action of water, the ether type urethane-based resin is excellent in water resistance without receiving hydrolysis and the like. Hence, when the ether type urethane-based resin is used, the water resistance of the adhesive layer obtained by application and drying is further improved, and even when water washing is performed using a physical device, the damage on the adhesive layer caused by the water washing tends to be further suppressed. In particular, since the ether type urethane-based resin and the acrylic-based resin are used in combination, compared to the case in which the acrylic-based resin is only used, the water resistance tends to be improved. From the point as described above, when predetermined amounts of the acrylic-based resin and the urethane-based resin are used in combination, the reason the adhesiveness, the strength, and the water resistance are simultaneously obtained can also be understood.

The content U of the urethane-based resin with respect to the total mass of the aqueous adhesive composition is preferably 1.0 to 25 percent by mass, more preferably 3.0 to 20 percent by mass, and further preferably 4.0 to 15 percent by mass. Since the content U of the urethane-based resin is 1.0 percent by mass or more, the flexibility of the adhesive layer is further improved, and the mechanical strength tends to be further improved. In addition, since the content U of the urethane-based resin is 25 percent by mass or less, the adhesion and the water resistance of the adhesive layer tend to be further improved.

1.3. Surfactant

The surfactant is not particularly limited, and for example, an anionic surfactant, a nonionic surfactant, or a cationic surfactant may be mentioned.

The anionic surfactant is not particularly limited, and for example, a compound having an arbitrary hydrophilic group, such as a carboxylic acid-based, a sulfonic acid-based, a sulfate-based, or a phosphate-based group, and an arbitrary hydrophobic group, such as an aliphatic group or an aromatic group, may be mentioned.

As the anionic surfactant, for example, there may be mentioned an alkyl sulfocarboxylate salt, an alkyldiphenyl ether disulfonate salt, an α-olefin sulfonate salt, a polyoxyethylene alkyl ether acetate salt, N-acylamino acid or its salt, an N-acylmethyltaurine salt, an alkyl sulfate salt, such as ammonium lauryl sulfate or sodium lauryl sulfate, an alkyl sulfonate polyoxyalkyl ether sulfonate salt, an alkyl sulfonate polyoxyethylene alkyl ether phosphate salt, a rosin acid soap, a castor oil sulfonate ester salt, a lauryl alcohol sulfonate ester salt, an alkyl phenol phosphate, an alkyl phosphate, an alkyl allyl sulfonate salt, a diethyl sulfosuccinate salt, a diethyl hexyl sulfosuccinate salt, or a dioctyl sulfosuccinate salt. A commercial product of the anionic surfactant is not particularly limited, and for example, Pelex SS-H or Pelex SS-L (trade name, manufactured by Kao Corporation) may be mentioned. The anionic surfactant may be used alone, or at least two types thereof may be used in combination.

As the nonionic surfactant, for example, there may be mentioned an acetylene glycol surfactant, a silicone surfactant, a polyoxyethylene alkyl ether, a polyoxyethylene alkylphenyl ether, a polyoxyethylene fatty acid ester, a polyoxyethylene hydrogenated castor oil, a propylene glycol fatty acid ester, a glycerin fatty acid ester, a polyglycerin fatty acid ester, a sorbitan fatty acid ester, a sucrose fatty acid ester, an alkyl polyglycoside, an alkyl diethanolamide, or an alkylamine oxide.

As the cationic surfactant, for example, there may be mentioned an alkylamine salt, a fatty acid amidoamine salt, a monoalkyl quaternary ammonium salt, a dialkyl quaternary ammonium salt, a trialkyl quaternary ammonium salt, a benzalkonium quaternary ammonium salt, benzethonium chloride, or an alkylpyridinium salt.

Among those mentioned above, the anionic surfactant is preferable, an ammonium salt type anionic surfactant, such as ammonium lauryl sulfate, is more preferable, and an ammonium alkyl sulfate surfactant is further preferable. When at least one of the surfactants as mentioned above is used, the water resistance of the adhesive layer obtained by application and drying is further improved, and even when water washing is performed using a physical device, the damage on the adhesive layer caused by the water washing tends to be further suppressed.

A content S of the surfactant with respect to the total mass of the aqueous adhesive composition is preferably 0.1 to 10 percent by mass, more preferably 0.5 to 8.0 percent by mass, even more preferably 1.0 to 6.0 percent by mass, and further preferably 1.5 to 4.0 percent by mass. Since the content S of the surfactant is in the range described above, the water resistance and the mechanical strength of the adhesive layer tend to be further improved.

1.4. Water

A content of the water with respect to the total mass of the aqueous adhesive composition is preferably 30 to 80 percent by mass, more preferably 35 to 70 percent by mass, and further preferably 40 to 60 percent by mass.

1.5. Ammonia and Amine Compound Having Standard Boiling Point of 100° C. or Less The aqueous adhesive composition of this embodiment preferably includes ammonia and/or an amine compound having a standard boiling point of 100° C. or less (hereinafter, simply referred to as "amine compound").

Since the acrylic-based resin to contribute to the adhesiveness and the urethane-based resin to contribute to the flexibility are used in predetermined amounts, and furthermore, since the anionic surfactant and ammonia are also contained, the stability of the aqueous adhesive composition is improved, and the water resistance and the mechanical strength of the adhesive layer to be obtained tend to be further improved. In the case described above, the ammonia may also function as an emulsion stabilizer (pH adjuster). In addition, the anionic surfactant, in particular, an ammonium alkyl sulfate surfactant, may also function as an emulsion dispersant of the aqueous adhesive composition. Accordingly, even when an aqueous acrylic-based resin and/or an aqueous urethane-based resin is used, the water resistance of the adhesive layer obtained by application and drying is further improved, and even when water washing is performed using a physical device, the damage on the adhesive layer caused by the water washing tends to be suppressed.

In addition, when the aqueous adhesive composition is evaporated, the amine compound improves a film forming property and the water resistance. In particular, when an amine compound having a boiling point of 100° C. or less and ammonia having a boiling point of −33° C. are used in combination, the evaporation in the film formation is promoted, and the mechanical strength and the water resistance of the adhesive layer to be obtained are further improved. Accordingly, even when an aqueous acrylic-based resin and/or an aqueous urethane-based resin is used, the water resistance of the adhesive layer obtained by application and drying is further improved, and even when water washing is performed using a physical device, the damage on the adhesive layer caused by the water washing tends to be suppressed.

The amine compound is not particularly limited, and for example, monoethylamine, diethylamine, triethylamine, isopropylamine, or triethanolamine may be mentioned. In addition, since being easily evaporated at a water boiling point of 100° C. or less, monoethylamine, diethylamine, triethylamine, or isopropylamine is preferable.

A content N1 of the ammonia with respect to the total mass of the aqueous adhesive composition is preferably 0.1 to 5.0 percent by mass, more preferably 0.3 to 2.0 percent by mass, and further preferably 0.5 to 3.0 percent by mass. Since the content N1 of the ammonia is in the range described above, the water resistance tends to be further improved. In addition, in the content N1 of the ammonia, a content of ammonium ions contained in the aqueous adhesive composition may also be contained.

A content N2 of the amine compound with respect to the total mass of the aqueous adhesive composition is preferably 0.1 to 2.5 percent by mass, more preferably 0.2 to 2.0 percent by mass, and further preferably 0.3 to 1.5 percent by mass. Since the content N2 of the amine compound is in the range described above, a dispersion stability of the aqueous adhesive composition is improved, and in addition, the water resistance and the mechanical strength of the adhesive layer to be obtained tend to be further improved.

The content N1 of the ammonia is preferably higher than the content N2 of the amine compound. A ratio (N1/N2) of the content N1 of the ammonia to the content N2 of the amine compound is preferably 1.1 to 10, more preferably 1.2 to 8.0, even more preferably 1.3 to 6.0, and further preferably 1.5 to 4.0. Accordingly, when the amine compound and the ammonia are used in combination, the evaporation in the film formation is promoted, and the mechanical strength and the water resistance of the adhesive layer to be obtained tend to be further improved.

In addition, the content S of the surfactant is preferably higher than the content N1 of the ammonia. A ratio (S/N1) of the content S of the surfactant to the content N1 of the ammonia is preferably 1.1 to 10, more preferably 1.3 to 8.0, even more preferably 1.5 to 6.0, and further preferably 1.7 to 4.0. Accordingly, the water resistance of the adhesive layer obtained by application and drying is further improved, and even when water washing is performed using a physical device, the damage on the adhesive layer caused by the water washing tends to be suppressed.

1.6. Organic Solvent

In order to reduce the influences on the environmental loads and human bodies, the aqueous adhesive composition of this embodiment preferably contains no organic solvents. In addition, when an organic solvent is contained, the content thereof with respect to the total mass of the aqueous adhesive composition is preferably 5.0 percent by mass or less, more preferably 2.5 percent by mass or less, and further preferably 1.0 percent by mass or less. Accordingly, since the environmental loads can be reduced, and VOC (volatile organic compounds) generated when the aqueous adhesive composition is used can also be reduced, the working conditions tend to be further improved.

In addition, in the organic solvents of this embodiment, the amine compounds and the surfactants described above are not contained.

1.7. Colorant

The aqueous adhesive composition of this embodiment preferably contains no colorants. In addition, when a colorant is contained, the content thereof with respect to the total mass of the aqueous adhesive composition is preferably 1.0 percent by mass or less, more preferably 0.5 percent by mass or less, and further preferably 0.3 percent by mass or less. Accordingly, the aqueous adhesive composition of this embodiment can be clearly discriminated from a composition, such as an ink composition, a printing paste, or a paint, to be used for coloration.

1.8. pH

A pH of the aqueous adhesive composition of this embodiment is preferably 7.0 or more, more preferably 7.1 to 12, even more preferably 7.5 to 11, and further preferably 8.0 to 10. Since the pH indicates alkalinity, the dispersion stability of the aqueous adhesive composition is improved, and in addition, when the water, the ammonia, and the triethylamine contained in the aqueous adhesive composition are evaporated in drying, the composition is neutralized, and in addition, a dry coating film (adhesive layer) is formed while the water resistance thereof is improved. Accordingly, since the pH indicates alkalinity, the dispersion stability in water and the water resistance after the drying can be simultaneously obtained.

2. Adhesiveness Imparting Method

An adhesiveness imparting method of this embodiment includes a step of forming an adhesive layer by adhering the aqueous adhesive composition described above on a surface of a cloth transport member of an ink jet printing apparatus.

The step of forming an adhesive layer is a step of forming an adhesive layer by adhering the aqueous adhesive composition described above on a surface of a cloth transport member. A method to adhere the aqueous adhesive composition to the cloth transport member is not particularly limited, and for example, the aqueous adhesive composition may be applied uniformly over the entire surface of the cloth transport member using a blade or the like, or the aqueous adhesive composition may be partially applied on the surface of the cloth transport member to form a predetermined pattern.

In addition, in the step of forming an adhesive layer, the aqueous adhesive composition may be dried to form the adhesive layer. A drying temperature is preferably 10° C. to 60° C. and more preferably 20° C. to 40° C. In addition, a drying time is preferably 1 to 24 hours and more preferably 2 to 8 hours. Accordingly, the water resistance and the mechanical strength of the adhesive layer to be obtained tend to be further improved.

3. Ink Jet Printing Apparatus

An ink jet printing apparatus of this embodiment includes a transport mechanism in which a cloth is adhered to an adhesive layer that is formed of the aqueous adhesive composition described above on a surface of a cloth transport member and is transported; a recording portion to perform printing recording using an ink jet head on the cloth adhered to the adhesive layer; and a washing portion to wash the adhesive layer from which the cloth is peeled away after the printing recording.

With reference to FIG. 1, an ink jet printing apparatus 100 of this embodiment will be described. FIG. 1 is an entire structural view of the ink jet printing apparatus 100 which includes a transport device 200 of this embodiment. In FIG. 1, arrows a and b each indicate a transport direction of a recording medium 300. Arrows c and d each indicate a moving direction of a cloth transport member 210. Arrows e and f indicate rotation directions of transport rollers 221 and 222, respectively.

The ink jet printing apparatus 100 may include the transport device 200 in which a recording medium is adhered to a surface of the cloth transport member 210 and is transported, recording medium transport rollers 111 and 112, and a recording portion 120. The recording medium 300 coming along the direction a is pressed to the cloth transport member 210 by the recording medium transport roller 111 and is then adhered to the surface of the cloth transport member 210.

While being adhered to the surface of the cloth transport member 210, the recording medium 300 is transported under the recording portion 120 by the transport device 200, and recording is then performed on the recording medium 300 by the recording portion 120. In addition, subsequently, at the recording medium transport roller 112, the recording medium 300 is peeled away from the cloth transport member 210.

The recording portion 120 may eject an ink composition or the like by an ink jet method. In this embodiment, although the case in which an ink jet type head is used for the recording portion 120, and printing is performed on a textile-type cloth as the recording medium 300 is assumed, the configuration is not limited thereto.

The transport device 200 may include the pair of transport rollers 221 and 222, the cloth transport member 210, a drive motor 230, a control device 240, a washing portion 250, and a removal portion 260.

The transport rollers 221 and 222 are each a roller to transport the cloth transport member 210 in a predetermined direction. In addition, the cloth transport member 210 may be a belt member having a surface on which an adhesive layer is formed and may be provided around the transport rollers 221 and 222. Since the transport rollers 221 and 222 are rotated by the drive motor 230, the cloth transport member 210 transports the recording medium in an arrow c direction. The control device 240 may control at least one of the transport device 200 and the ink jet printing apparatus 100.

The washing portion 250 washes the surface of the cloth transport member 210 from which the recording medium 300 is peeled away. By the washing portion 250, components of the recording medium 300 and printing colorants which are adhered to the cloth transport member 210 in the printing are washed out. In the washing portion 250, a pump (not shown), a sprinkler port, and a sprinkler pipe may be provided.

The removal portion 260 removes water adhered to the cloth transport member 210 by the washing portion 250. The removal portion 260 is not particularly limited, and for example, a blade may be mentioned. As a blade material, an elastic material is preferable. Furthermore, in view of abrasion resistance, a polyurethane is preferable. Although a contact section in contact with the cloth transport member 210 may have a rectangular cross-section, a contact section having a diagonally truncated head may also be used.

As the cloth transport member 210, an elastic material is preferable. A heater (not shown) to warm the cloth transport member 210 may also be provided. In the step of washing the cloth transport member 210, for example, a water receiver (not shown) to receive washing water and a brush (not shown) or a sponge (not shown) to clean the cloth transport member 210 may also be used.

As the recording medium 300, for example, there may be mentioned a cloth formed from natural fibers of silk, cotton, or wool, or synthetic fibers of a nylon, a polyester, or a rayon.

4. Cloth Transport Member of Ink Jet Printing Apparatus

A cloth transport member of an ink jet printing apparatus of this embodiment has a surface on which an adhesive layer derived from the aqueous adhesive composition described above is provided. Although the cloth transport member is not particularly limited, for example, an elastic material is preferable, and an urethane material is particularly preferable. Since the aqueous adhesive composition described above in which an urethane-based resin and an acrylic-based resin are contained in combination is used for the cloth transport member as described above, the adhesion between the adhesive layer and the cloth transport member is further improved, and the durability thereof is also improved.

5. Ink Jet Printing Method

An ink jet printing method of this embodiment includes a transport step in which a cloth is adhered to an adhesive layer that is formed from the aqueous adhesive composition described above on a surface of a cloth transport member of an ink jet printing apparatus and is transported; a recording step of performing printing recording using an ink jet head on the cloth adhered to the adhesive layer; and a washing step of washing the adhesive layer from which the cloth is peeled away after the printing recording.

5.1. Transport Step

The transport step is a step in which a cloth is adhered to an adhesive layer that is formed from the aqueous adhesive composition described above on a surface of a cloth transport member of an ink jet printing apparatus and is transported. An adhering method is not particularly limited, and as shown in FIG. 1, a method in which the cloth and the adhesive layer are pressed and adhered to each other using the transfer roller may be mentioned.

5.2. Recording Step

The recording step is a step of performing printing recording using an ink jet head on the cloth adhered to the adhesive layer. In the recording step, the cloth is transported while being in close contact with the cloth transport member with the adhesive layer provided therebetween, and in this transport process, an ink is ejected from the recording portion 120 and is adhered to the cloth. Subsequently, the cloth to which the ink is adhered may be recovered after being peeled away from the adhesive layer.

5.3. Washing Step

The washing step is a step of washing the adhesive layer from which the cloth is peeled away after the printing recording. By this step, trash, such as lint, derived from the cloth and adhered to the surface of the adhesive layer in the recording step can be removed therefrom.

EXAMPLES

Hereinafter, the present disclosure will be described in more detail with reference to Examples and Comparative Examples. The present disclosure is not limited at all to the following Examples.

1. Preparation of Aqueous Adhesive Composition

FIGS. 2A and 2B are tables each showing compositions of aqueous adhesive compositions. The components were charged in a mixing tank to have one of the compositions shown in the tables and were then mixed by stirring, so that the aqueous adhesive composition of each Example was obtained. In addition, the acrylic-based resin and the urethane-based resin shown in each Example of the tables are emulsions, and a solid content thereof is represented by percent by mass as the "component content". In addition, the "component content" of ammonia water indicates that the content of ammonia is 28 percent by mass. The other components contain no solvents and the like and are each a product at a content of 100 percent by mass as the "component content".

In addition, in the tables, a use amount of each component which contains a solvent and the like, that is, for example, a use amount thereof in an emulsion state, is represented as the "experiment amount", and a value corresponding to the component content of the "experiment amount" is represented as the "content". For example, the acrylic-based resin of Example 1 indicates that an emulsion, the content of which is 89.5 percent by mass, is used, and a solid content in the aqueous adhesive composition is 53.7 percent by mass. Unless otherwise particularly noted, the other numerical values represent percent by mass. The components shown in the tables are as described below.

Acrylic-Based Resin aqueous acrylic emulsion (product name: BPW6441, manufactured by TOYOCHEM CO., LTD.)

Urethane-Based Resin aqueous urethane emulsion (ether type urethane-based resin, product name: UA200, manufactured by Sanyo Chemical Industries, Ltd.)

aqueous urethane emulsion (ester type urethane-based resin, product name: UXA307, manufactured by Sanyo Chemical Industries, Ltd.)

aqueous urethane emulsion (carbonate type urethane-based resin, product name: UA368, manufactured by Sanyo Chemical Industries, Ltd.)

Surfactant ammonium lauryl sulfate sodium lauryl sulfate

Acid/Alkali ammonia water (including ammonium ions)

Na ions triethylamine triethanolamine

2. Evaluation Method

2.1. Adhesion

In accordance with JIS Z 0237, a 180°-peeling adhesion was measured. In particular, an adhesive was applied on a slide glass having a width of 25 mm and was then dried, so that an adhesive layer sample having a thickness of 0.2 mm was formed. After a cotton cloth and the adhesive layer sample were roller-pressed at a pressure of 0.5 kgf/25 mm, measurement of a 180°-peeling adhesion was performed thereon. The measurement was performed at a temperature of 23° C.

Evaluation Criteria

A: adhesion of 2.0 N/25 mm or more

B: adhesion of 1.0 to less than 2.0 N/25 mm

C: adhesion of less than 1.0 N/25 mm

2.2. Pencil Hardness

In accordance with the pencil hardness test of JIS K5400, a mechanical strength evaluation of the adhesive was performed on the adhesive layer sample formed as described above. In the JIS measurement method, the scratch is formed by pushing a pencil at a slanting angle of 45°; however, since the adhesive in this measurement was soft, the pencil hardness evaluation was performed by the scratch formed by pulling a pencil. The measurement was performed at a temperature of 23° C.

Evaluation Criteria

A: no scratch is formed by pencil having 2H hardness

B: no scratch is formed by pencil having 6B hardness

C: scratch is formed by pencil having 6B hardness

2.3. Water Resistance

After the adhesive layer sample formed as described above was immersed in pure water at 23° C. for one hour, the degree of whitening of the adhesive layer sample was evaluated by visual inspection. As the degree of whitening was higher, the water resistance was regarded as inferior, and by the degree of whitening, the water resistance was evaluated in accordance with the following evaluation criteria.

EVALUATION CRITERIA

A: transparent

B: slight whitening

C: apparent whitening

What is claimed is:

1. An aqueous adhesive composition to form an adhesive layer on a surface of a cloth transport member of an ink jet printing apparatus, the aqueous adhesive composition comprising:

an acrylic-based resin;

a urethane-based resin;

a surfactant; and water, wherein a content A of the acrylic-based resin is higher than a content U of the urethane-based resin, and wherein a ratio (A/U) of the content A of the acrylic-based resin to the content of U of the urethane-based resin is 7.5 to 30.

2. The aqueous adhesive composition according to claim 1, further comprising:

ammonia; and an amine compound having a standard boiling point of 100° C. or less.

3. The aqueous adhesive composition according to claim 2, wherein a content N1 of the ammonia is higher than a content N2 of the amine compound.

4. The aqueous adhesive composition according to claim 1, wherein the urethane-based resin includes an ether type urethane-based resin.

5. The aqueous adhesive composition according to claim 1, wherein the surfactant includes an ammonium salt type anionic surfactant.

6. The aqueous adhesive composition according to claim 1, wherein the content A of the acrylic-based resin with respect to a total mass of the aqueous adhesive composition is 26 to 50 percent by mass.

7. The aqueous adhesive composition according to claim 1, wherein the content U of the urethane-based resin with respect to a total mass of the aqueous adhesive composition is 1.0 to 25 percent by mass.

8. The aqueous adhesive composition according to claim 1, wherein a content of the water with respect to a total mass of the aqueous adhesive composition is 30 to 80 percent by mass.

9. The aqueous adhesive composition according to claim 1, wherein when the aqueous adhesive composition further comprises an organic solvent or no organic solvent, a content of the organic solvent with respect to a total mass of the aqueous adhesive composition is 5.0 percent by mass or less.

10. The aqueous adhesive composition according to claim 1, wherein when the aqueous adhesive composition further comprises a colorant or no colorant, a content of the colorant with respect to a total mass of the aqueous adhesive composition is 1.0 percent by mass or less.

11. An adhesiveness imparting method comprising:

forming an adhesive layer by adhering the aqueous adhesive composition according to claim 1 to a surface of a cloth transport member of an ink jet printing apparatus.

12. An ink jet printing apparatus comprising:

a transport mechanism in which a cloth is adhered to an adhesive layer that is formed of the aqueous adhesive composition according to claim 1 on a surface of a cloth transport member and is transported;

a recording portion to perform printing recording using an ink jet head on the cloth adhered to the adhesive layer; and a washing portion to wash the adhesive layer from which the cloth is peeled away after the printing recording.

13. A cloth transport member of an ink jet printing apparatus, having a surface on which an adhesive layer derived from the aqueous adhesive composition according to claim 1 is provided.

14. An ink jet printing method comprising:

a transport step in which a cloth is adhered to an adhesive layer that is formed from the aqueous adhesive composition according to claim 1 on a surface of a cloth transport member of an ink jet printing apparatus and is transported;

a recording step of performing printing recording using an ink jet head on the cloth adhered to the adhesive layer; and a washing step of washing the adhesive layer from which the cloth is peeled away after the printing recording.

* * * * *